United States Patent
Born et al.

[15] 3,665,274
[45] May 23, 1972

[54] REVERSIBLE MOTOR CONTROL HAVING ALTERNATIVELY OPERATIVE DUAL AMPLIFIERS AND AUTOMATIC RESPONSE ADJUSTMENT

[72] Inventors: Norman E. Born; Edwin E. Kolatorowicz; Harry A. Plumb, Jr., all of Erie, Pa.

[73] Assignee: General Electric Company

[22] Filed: May 5, 1970

[21] Appl. No.: 34,709

[52] U.S. Cl. .............................................318/257, 318/331
[51] Int. Cl. ......................................................H02p 5/06
[58] Field of Search ..........................318/308, 257, 454, 331

[56] References Cited

UNITED STATES PATENTS

| | | | |
|---|---|---|---|
| 3,419,777 | 12/1968 | Asseo | 318/331 X |
| 3,388,307 | 6/1968 | Prapis et al. | 318/434 |
| 3,457,485 | 7/1969 | Leonard | 318/257 |

Primary Examiner—J. D. Miller
Assistant Examiner—Robert J. Hickey
Attorney—James C. Davis, Jr., Edward W. Goebel, Jr., Frank L. Neuhauser, Oscar B. Waddell and Joseph B. Forman

[57] ABSTRACT

A drive system including a d-c motor has improved control means for generating a regulated control signal for controlling the supply of electric power to the motor. The control system includes a first amplifier operative when a net positive input signal is supplied thereto, a second amplifier operative when a net negative input signal is supplied thereto, means for supplying a command signal having a polarity and magnitude representative of desired motor performance to each amplifier, means for supplying a negative polarity signal representative of actual motor performance to the first amplifier and a positive polarity signal representative of actual motor performance to the second amplifier, and means for producing in response to the output of said amplifiers the regulated control signal. The control system also includes stabilizing means common to the two amplifiers and means for automatically adjusting the response of the amplifiers.

8 Claims, 3 Drawing Figures

Patented May 23, 1972

INVENTORS
NORMAN E. BORN
EDWIN E. KOLATOROWICZ
HARRY A. PLUMB, JR.

BY *Edward A. Foell*

THEIR ATTORNEY

FIG. 3

REVERSIBLE MOTOR CONTROL HAVING ALTERNATIVELY OPERATIVE DUAL AMPLIFIERS AND AUTOMATIC RESPONSE ADJUSTMENT

BACKGROUND OF THE INVENTION

This invention relates to motor control systems, and more specifically to closed-loop, regulated motor control systems. The invention is particularly advantageous to systems which provide reversing, d-c motor operation over a wide speed range including both armature voltage and field weakening speed ranges.

In a reversing, d-c motor control system, for example, if the regulated parameter of motor performance is speed, a speed sensor is employed. The speed sensor is often a tachometer generator — either a-c or d-c — driven at a speed proportional to the motor speed. The tachometer-generator, during its operation, provides an output, termed a feedback, which is essentially linearly proportional to its operating speed. In a closed-loop system in which motor speed is regulated, a feedback signal is introduced into a summing junction for comparison with a command reference signal. Any difference in the magnitudes of these two signals is termed an error signal. It is the error signal which is amplified in a motor controller to a level at which it governs the motor performance with respect to speed.

The foregoing treats of a conventional d-c motor speed regulating system with negative feedback. The term "negative feedback" indicates a feedback signal which is opposite in polarity to the command reference signal. Thus, the negative feedback signal tends to cancel the command reference signal and, in fact, does so when the motor operates at precisely the level of performance which corresponds to the command reference signal. A feedback signal which is of the same polarity as the command reference signal, so that it adds to this signal, is a positive feedback. If positive feedback occurs inadvertently in a motor speed regulating system, a runaway condition exists, since the error signal becomes the sum of the command reference and feedback signals rather than the difference between them. The feedback signal, in this instance, increases with the speed of the drive motor, creating an ever-increasing apparent error signal as motor acceleration continues, and may result in severe overspeed of the motor.

This positive feedback signal is most likely to occur during the installation of a motor control system employing both d-c command reference and d-c feedback signals since electrical connections between the tachometer generator and the motor controller may be established by personnel unaware of the consequences of such an error.

To provide a polarized d-c feedback signal, many motor control systems include a full-wave rectifier bridge connected between the tachometer generator and the motor controller. The feedback signal from the tachometer generator, whether a-c or d-c, is connected to the terminals of the rectifier bridge at which a-c to be rectified is normally introduced. The terminals of the rectifier bridge from which d-c is normally derived, are customarily connected —one to an amplifier, and one to a system common bus — in the motor controller. The motor controller thus receives a d-c feedback signal of a specific polarity from either an a-c tachometer generator or a d-c tachometer generator connected in either polarity to the bridge.

Application of the full wave rectifier bridge, as described, to a reversing motor control system using a tachometer generator results in a feedback signal of fixed polarity regardless of the direction of tachometer generator rotation. Normally in a system employing such rectification, the use of signal reversing contacts for the command reference signal and/or the feedback signal is required and the tachometer generator is not connected to a common conductor of the control system. This "floating" condition of the feedback circuit increases its susceptibility to extraneous, unwanted noise pulses inductively or capacitively coupled to the circuit.

In relation to the foregoing facets of motor control system operation, the amplifier stage of the present invention provides several improvements not included in conventional equipment. One accomplished objective resides in the capability of the amplifier stage to establish a polarity-reversible error signal and respond thereto with a polarity-reversible output with no signal reversing contacts in either the command reference signal circuit or the feedback signal circuit.

Another objective of this invention is the provision of circuitry to accommodate at the feedback signal input terminals an electrical output of a floating feedback source of a-c or of d-c without regard to polarity, and to derive therefrom a pair of equal d-c feedback signals, oppositely polarized. This provision virtually eliminates the possibility of obtaining the potentially damaging positive feedback mentioned earlier.

Another attained object of this invention is the inclusion in its feedback circuitry of a path for attenuating the previously mentioned noise which may develop in the feedback source or its connections to the motor control system.

Another problem associated with motor control systems relates to those systems having motors which are to be operated over a wide speed range.

It is well known that a conventional shunt wound d-c motor may be operated over a wide speed range consisting of two segments. The first segment is obtained by supplying rated current to the shunt field of the motor and varying the voltage applied to the armature of the motor between zero and the rated value. This segment of the total motor speed range is commonly known as the armature voltage or constant torque speed range and extends upwards from zero speed to a base speed. Base speed of a motor is that speed which results when the shunt field is operated at rated current and the armature of a motor is operated at its rated voltage level, with the motor operating at full load and at its intended temperature. The second segment of the total speed range is achieved by maintaining the motor armature voltage at its rated level and reducing the level of the shunt field current below its rated level. This second segment of the speed range of the motor is known as the field weakening or constant horsepower speed range.

It is also well known in the motor control art that a motor operating in its constant horsepower speed range, say at twice its base speed, develops only one-half of the torque per ampere of armature current which it develops in the constant torque speed range. With respect to torque, the motor suffers an inherent loss of gain as its speed is progressively increased above base speed. Since torque is the parameter of motor performance governing the motor's ability to accelerate or decelerate both its own armature and a connected load, the motor's response to a change of either load or command reference signal is slower in its constant horsepower speed range than in its constant torque speed range. To assure motor control system stability in the constant torque speed range of the motor, where the motor response is a maximum, the response of the motor controller must be set at such a level that operation of the motor in its constant horsepower, reduced response speed range is at less than optimism system gain.

It is another object of this invention to provide a motor control system operating over a wide speed range which is capable of rapid response to input signal level changes in the field weakening, constant horsepower speed range without causing unstable operation in the constant torque speed range.

Briefly stated and in accordance with one aspect of this invention, a reversing motor control system includes a polarity-reversible command reference signal source, a feedback signal source having an electrical output and a pair of polarity-sensitive amplifier networks with input and output circuits. The feedback signal source output is rectified into feedback signal of definitely established polarity regardless of the actual polarity or wave shape and frequency of the electrical output of the feedback source. A command reference signal of a first polarity provided at the input circuit of the amplifier networks energizes an output circuit of one of the amplifier networks so as to normally cause motor rotation in a first direction. A command reference signal of the opposite polarity provided at the input circuit of the amplifier networks energizes an output circuit of the other amplifier network which normally causes motor rotation in the opposite direction. A comparison of the magnitude of the feedback signals with that of the command reference signal yields an error signal indicative of a deviation in actual motor performance from the desired performance. This error signal is processed in the amplifier network activated for the desired direction of motor rotation. The activated amplifier network produces an output which tends to establish correspondence between the actual motor performance and the desired motor performance.

As described in the "Background of the Invention" a d-c motor operated at a level of shunt field current which is less than the rated shunt field current undergoes a reduction of torque. The torque reduction diminishes the ability of the motor to respond to sudden changes in the command reference signal or in the motor load. In accordance with another aspect of this invention, the response of the motor control system is maintained at a satisfactory level in spite of the reduction in motor torque and response capability by increasing the response rate of the control portion of the system. A feedback signal indicates when the motor torque is reduced to a selected level at which the response of the motor control system is unsatisfactory. Amplifiers incorporated in motor control systems normally employ a stabilizing network in which capacitors are used. The capacitors retard the rate of change of impressed error signals to provide stability in the system, and decrease the response rate of the control portion of a system.

To increase the response of the system, a switching circuit which provides a signal-attenuating path and an additional discharge path for the stabilizing capacitor is added to an amplifier network. When the feedback circuit indicates that the motor torque capability is at the selected, reduced level, the switching circuit is activated. This increases the response rate of the control portion of the motor control system, and thus increases the response of the whole motor control system.

The specification concludes with claims particularly pointing out and distinctly claiming the subject matter of this invention. The organization and manner of making and using this invention together with further objects and advantages of this invention may be best understood by reference to the following description taken in conjunction with the accompanying figures.

An identification number assigned to any part or portion of a figure identifies that same part or portion in whatever figure that number appears.

DETAILED DESCRIPTION OF THE FIGURES

For reasons of clarity only, the following descriptions are directed to a motor control system which serves to regulate the speed of a d-c motor included in that system. The invention disclosed is equally applicable to systems regulating another of the motor performance parameters, and is, in fact, not limited to motor control systems.

Figures 1, 2:
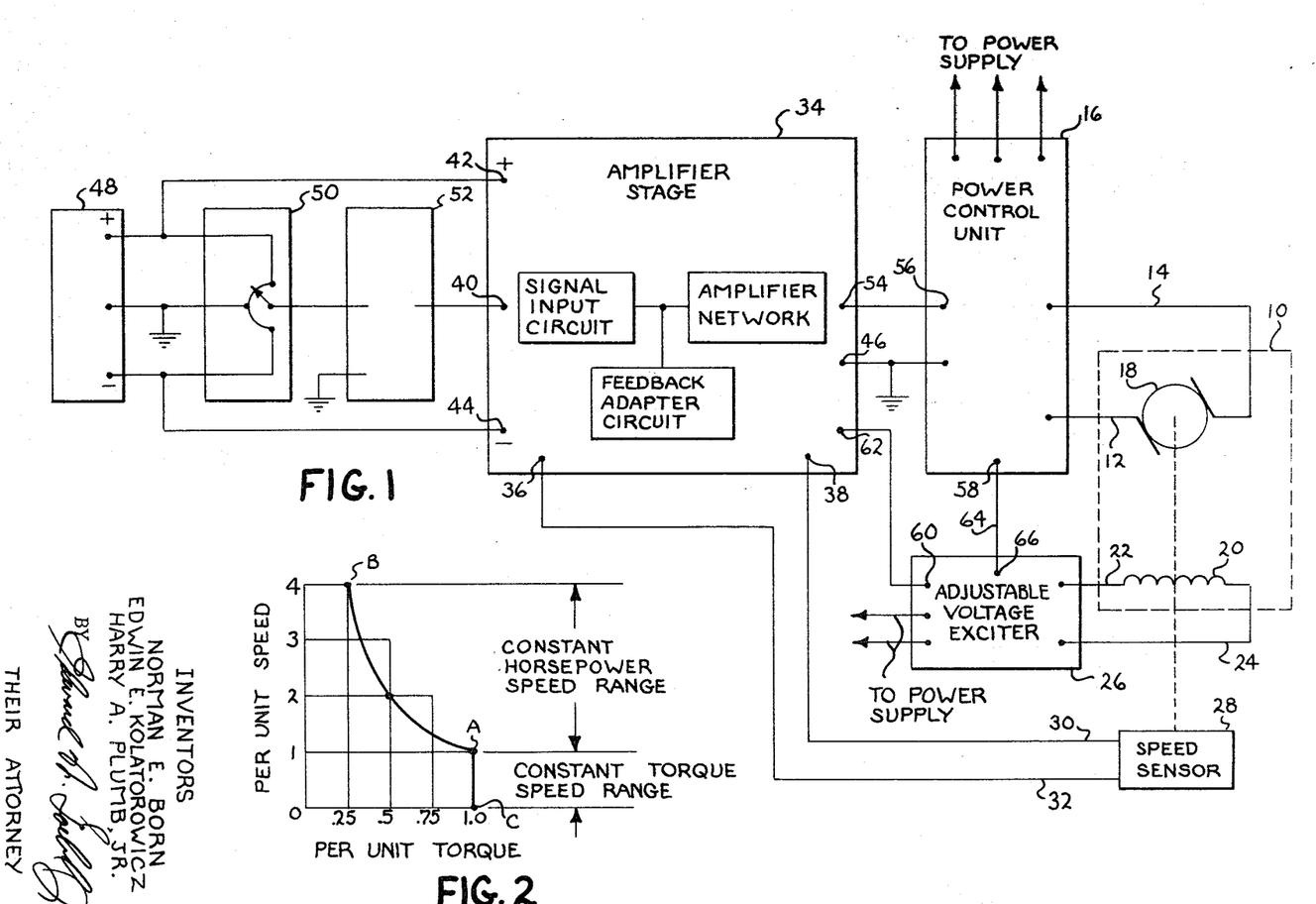
FIG. 1 is a typical motor control system in block diagram form incorporating the instant invention.
FIG. 2 is a graph depicting the more pertinent characteristics of a d-c motor.

FIG. 1 is a block diagram representing a motor control system in which motor performance is regulated with respect to speed. The regulated speed range of the motor includes both armature voltage and field weakening speed ranges.

In FIG. 1, a motor 10 is shown with connections 12 and 14 to conduct power between a power control unit 16 and the motor armature 18. The power control unit 16, in response to a controlled input signal, meters the power delivered to the motor armature 18 in accordance with the demands of the motor control system. If the power control unit 16 is to convert a-c power from its power supply to d-c power for utilization in the motor armature 18, any of several technologies might be used in the power control unit 16 to accomplish the power conversion. For example, a motor-generator set would perform the function. If static conversion without rotating machinery in the power control unit 16 were desired, the controlled power conversion from a-c to d-c might be performed by either tube-type or solid state devices, capable of rectification, with reactor or firing pulse control to govern the d-c output to the motor armature 18.

The motor 10 also includes a field winding 20 with conductors 22 and 24 connecting it to its adjustable voltage exciter 26. The adjustable voltage exciter 26, like the power control unit 16, may take any one of several forms. Since it furnishes the power requirements of the motor 10 shunt wound field 20, the adjustable voltage exciter 26 should possess the capability of providing d-c power at a plurality of d-c voltage levels. Such means as a rheostat, for example, driven by a motor might be used if the power supply is d-c. If an a-c power supply is employed, controlled power conversion employing controllable rectifiers, for example, may be used.

A speed sensor 28 is indicated as mechanically coupled to the motor armature 18. The speed sensor may comprise a tachometer generator having either an a-c or d-c output or it may include a pulse generator together with a digital-to-analog converter. In reality, the speed sensor 28 may be coupled directly or indirectly to the motor armature 18, the only requirement being that it be positively coupled to operate at a speed proportional to that of the motor armature 18. Two leads, 30 and 32, interconnect the speed sensor 28 with an amplifier stage 34 through feedback input terminals 36 and 38 included in the amplifier stage 34. In accordance with this invention, the speed sensor 28 may supply a feedback which is either an a-c voltage or a d-c voltage to terminals 36 and 38, and without regard to polarity, if it is a d-c voltage. Rectification means, hereinafter described, provide for the accommodation and definite polarization in the amplifier stage 34 of this diversity of electrical feedbacks.

Also terminated in the amplifier stage 34, at terminal 40, is a command reference signal. Three terminals 42, 44, and 46 provide for connections between a three wire control power supply 48 and the amplifier stage 34, and are respectively the positive, the negative and the common or neutral interconnections. Interposed between the command reference signal terminal 40 of the amplifier stage 34 and the command signal source 50 is a block 52 representing any of a variety of possible command signal modifiers. A typical modifier in this location is a unit which provides a linearly changing output with respect to time, in response to a step-type input from the command signal source 50. The command signal source 50, indicated as a potentiometer-connected device in FIG. 1, may take any of several forms. A primary requirement is that in any form, it shall be capable of delivering an output of one voltage polarity with respect to a common system bus per direction of motor rotation desired. As shown, the command signal source 50 may be adjusted to yield either a positive output voltage or a negative output voltage with ready means for a transition from one polarity to the other. Similar facility for the provision of the required output prevails in many computers and process controllers. If the motor control system of FIG. 1 were to be operated as a slave drive to another such system, the control power supply 48 and the command signal source 50 might both be replaced, for example, by the output of a tachometer generator.

In accordance with this invention the reference signal applied to terminal 40 of the amplifier stage 34 may be of either positive or negative polarity with respect to the system common at terminal 46, depending on the desired direction of rotation of the motor. The reversible polarity of the reference signal allows the direction of rotation of the motor 10 to be changed without using switch contacts.

From an output terminal 54 of the amplifier stage 34, an input signal is supplied to the power Control Unit 16 at a terminal 56 to govern its performance and its output to the motor armature 18. This input signal to the power Control unit 16 is of a magnitude proportional to any voltage difference existing within the amplifier stage 34 between the command reference signal, introduced at its terminal 40, and the electrical feedback, introduced at its terminals 36 and 38. As it is shown in FIG. 1, the command signal source 50 has the capability of furnishing a polarity reversing signal to the command signal modifier represented by the block 52 if such a modifier is required in the motor control system. The polarity reversing signal is not required if only unidirectional motor 10 rotation is desired.

A control output terminal 58 of the power control unit 16 is connected to the variable output voltage exciter 26 to control the level of excitation of the motor field 20. A control output terminal 60 of the variable output voltage exciter 26 furnishes an input in the form of a feedback to the amplifier stage 34 at its terminal 62. It is the signal introduced into the amplifier stage 34 at the terminal 62 which causes a change in the response of the amplifier stage 34. This response change compensates for the inherent change of the motor 10 when it is operated in its constant horsepower speed range at a reduced level of motor field 20 excitation. An electrical connection 64 from the control output terminal 58 of the power control unit 16 to the adjustable output voltage exciter 26 conveys an electrical signal which governs the initiation and degree of motor field 20 excitation reduction.

A discussion of FIG. 2, immediately following, precedes an explanation of the operation of the motor control system of FIG. 1 to provide further clarification.

FIG. 2 shows graphically a typical speed-torque characteristic of a shunt wound d-c motor such as is identified by the numeral 10 in FIG. 1. The curve is plotted against per unit values of speed and torque with per unit speed as the ordinate and per unit torque as the abscissa. The motor operating condition termed base speed, previously defined in the "Background of the Invention," occurs at point "A" of FIG. 2. At point "A" the motor is operating at its rated torque, and its speed has been brought to the rated base speed value by the application of rated armature voltage. Between zero speed and base speed, motor field excitation is held constant at its rated value to enable the motor to develop its rated torque. As mentioned earlier, the speed range indicated by the curve segment "A" – "C" is variously known as the constant torque speed range or the armature voltage speed range.

Motor speeds greater than base speed are obtainable by either further increasing the voltage impressed on the motor armature to a value above the rated voltage or by reducing the motor field excitation. Since further increase of armature voltage to a value in excess of its rated voltage cannot be recommended, field weakening with progressively diminishing torque is employed. The curve segment "A" – "B" in FIG. 2 portrays the diminution of output torque which occurs in a typical 4:1 motor speed range provided by motor field weakening. A ratio expression such as the 4:1 employed above and shown in FIG. 2 is often used to define the relationship of top motor operating speed to the base speed of the motor. To fulfill the term "Constant Horsepower Speed Range," since horsepower is the product of torque and speed, as speed increases the torque must decrease. FIG. 2 shows this relationship clearly where at point "B," for example, the motor speed is four times its base speed and the torque is reduced to one fourth of its base speed value. This reduction in the torque output of the motor at speeds in excess of motor base speed reduces the ability of the motor to respond to a change in the command reference signal. The change in this command reference signal may correspond to either acceleration or deceleration of the motor and its load. At a reduced torque capability, the motor requires a longer period of time to accomplish a speed change corresponding to the change in the command reference signal, as compare to an identical change at or below motor base speed. This reduction in response rate in the field weakening speed range is the inherent response capability change of a d-c shunt wound motor mentioned earlier.

The operation of the motor control system of FIG. 1 is so closely related to the graph of FIG. 2 that the ensuing description of operation of FIG. 1 refers frequently to FIG. 2.

Assume that the motor 10 of FIG. 1 is to be accelerated from rest to a 100 percent speed corresponding to point "B" of FIG. 2 and has a 4:1 speed range. Assume also that those power supplies required are connected, that the command reference signal at terminal 40 of the amplifier stage 34 of FIG. 1 is zero, that a positive command reference signal corresponds to forward motor rotation and that a command reference signal of 100 percent corresponds to the top operating speed represented by point "B" of FIG. 2.

As the command reference signal at its input terminal 40 to the amplifier stage 34 of FIG. 1 is increased from zero to +25 percent, the motor 10, FIG. 1, accelerates to one-fourth of its top operating speed. The amplifier stage 34, through its output terminal 54 supplies an input signal to the power control unit 16 at its input terminal 56. In response to this input signal, the power control unit 16 output voltage to the motor armature 18 increases from zero to the rated value. The variable output voltage exciter 26 maintains rated current in the motor field 20, and the motor, having a 4:1 speed range, has traversed its constant torque speed range —the "C" – "A" segment of FIG. 2. The speed sensor 28 of FIG. 1 accelerates with the motor 10, and delivers a feedback proportional to its speed to the amplifier stage 34. When this feedback is properly proportional to the command reference signal, a comparison point within the amplifier stage 34 arrests the output voltage increase of the power control unit 16 and maintains it at essentially the attained level. The motor 10 acceleration is thereby terminated and its speed is held substantially constant at a value corresponding to point "A" of FIG. 2.

It is to be noted that, though the speed-torque curve of FIG. 2 — "C" – "A" – "B" is not linear, a graph of the motor speed plotted against the command reference signal yields a straight, unbroken line. This is true since the motor control system of FIG. 1 is linear with respect to motor 10 speed — the assumed regulated performance parameter.

To continue the motor 10 FIG. 1 acceleration to its 100 percent speed corresponding to point "B" of FIG. 2, the command reference signal applied to input terminal 40 FIG. 1 of the amplifier stage 34 is adjusted from its +25 percent setting to its +100 percent value. This, in a pure speed regulator as shown, increases the signal level at the output terminal 54 of the amplifier stage 34 to the input terminal 56 of the power control unit 16 proportionately.

Unlike the earlier discussed change of the command reference signal from zero to +25 percent which raises the power control unit 16 output voltage to the motor armature 18 from zero volts to rated voltage, changes in the command reference signal beyond the +25 percent level do not significantly alter the voltage applied to the motor armature 18. This voltage is held at its attained value of armature 18 rated voltage and the variable voltage exciter 26 output to the motor 10 shunt field 20 is reduced. The reduction of shunt field 20 current initiates motor 10 acceleration in its constant horsepower speed range with a diminution of output torque as portrayed in FIG. 2 by the curve segment "A" – "B."

The variable voltage exciter 26 output to the motor field 20 is governed by a signal indicative of motor 10 operation at the rated voltage of the motor 10 armature 18, and is derived from the power control unit 16 and introduced through the electrical connection 64 to an input terminal 66 of the exciter 26. This signal causes progressively diminishing adjustable voltage exciter 26 output as the command reference signal progresses from +25 percent to +100 percent of its value.

The adjustable voltage exciter 26 also provides a control output at its terminal 60. This control output connects to the amplifier stage 34 at terminal 62, and, in accordance with this invention, adjusts the amplifier stage 34 response. As discussed previously, the adjustment of response of the amplifier stage 34 is made to improve the response and accuracy of the total motor control system of FIG. 1. This change compensates for the motor 10 change illustrated in FIG. 2 by the curve "A" – "B" as speeds in the constant horsepower speed range are employed. In response to the earlier mentioned +100 percent command reference signal, the motor 10 increases in speed to its top operating level.

If the power control unit 16 of FIG. 1 is of a fully reversing type, properly protected, the motor 10, now operating at 100 percent speed in the forward direction may be decelerated to zero speed and re-accelerated in a reverse direction. To accomplish this without the use of contacts in the motor control system of FIG. 1 requires only that the command reference signal at input terminal 40 of the amplifier stage 34 be shifted from its 100 percent forward value to a value of reversed polarity corresponding to the desired reverse speed. Acceleration in the reverse direction involves the same operation as outlined above for the forward direction, but with a reversed polarity command reference signal assumed. If the reversing power control unit 16 is of the type which permits regenerative operation, whereby the kinetic energy of the motor 10 and its load may be returned to the power source on deceleration, a smooth, stepless reversal is experienced. Other means of drive retardation than regeneration may be employed but may result in a less smooth transition from rotation in one direction to rotation in the opposite direction.

Figure 3:
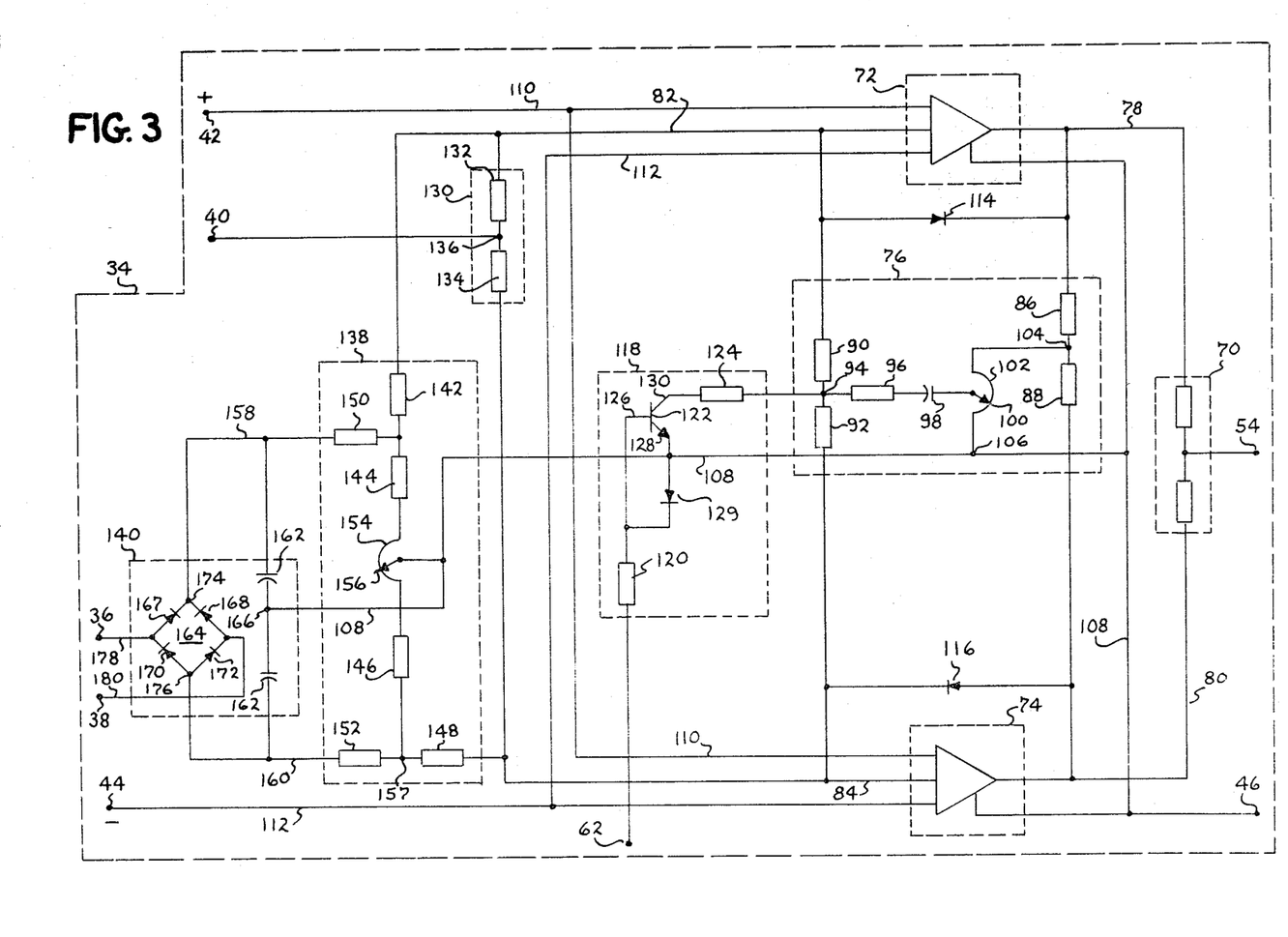
FIG. 3 is a schematic diagram of the instant invention.

FIG. 3 shows in detail the components and the circuitry included in the amplifier stage 34 of FIG. 1. Terminals for interconnecting the amplifier stage with other items shown in FIG. 1 are similarly numbered in FIGS. 1 and 3. For ease of discussion and clarity of definition, functional groups within FIG. 3 are set apart by the use of broken lines.

An output bridge 70 connected to first and second amplifiers, 72 and 74, respectively, furnishes a signal through output terminal 54 to the power control unit 16 of FIG. 1. A stabilizing circuit 76, FIG. 3, couples an output circuit 78 of the first amplifier 72 and an output circuit 80 of the second amplifier 74 to signal input circuits 82 and 84 of the first and second amplifiers 72 and 74, respectively. A substantially inherent relationship between stability and response prevails in a motor control system, and is dealt with in detail in the subsequent discussion of the system operation.

The stabilizing circuit 76 has an output bridge including resistors 86 and 88. A feedback bridge of the stabilizing circuit 76 including resistors 90 and 92, connects the signal input circuit 82 of the first amplifier 72 to the signal input circuit 84 of the second amplifier 74. A junction 94 between the resistors 90 and 92 of the stabilizing circuit 76 is electrically connected through a resistor 96 in series with a capacitor 98 to an adjustable slider 100 of a first potentiometer-connected resistance unit 102. The first potentiometer-connected resistance unit 102 provides an electrical circuit from a junction 104 between the resistors 86 and 88 of the output bridge to a common bus 108 through a junction 106. It is by means of adjusting the slider 100 that the stabilizing circuit 76 provides for setting the initial levels of response and stability of the amplifier stage 34 FIG. 1.

In addition to the signal input circuits 82 and 84, positive and negative power supply busses 110 and 112, respectively, and the common bus 108 are connected to the amplifiers 72 and 74. Oppositely polarized diode rectifiers 114 and 116 are connected between the signal input circuits 82 and 84 and the output circuits 78 and 80 of the first and second amplifiers 72 and 74, respectively. The function of these diode rectifiers 114 and 116 is included hereinafter in the description of operation of the amplifier stage 34. Details of the first and second amplifiers 72 and 74 are not shown in the figures, being well known in the operational amplifier art.

In accordance with one aspect of this invention, an automatic response adjust circuit 118 includes an input resistor 120, a semiconductor device such as a thyristor or transistor 122 and a shunting resistor 124. The input resistor 120 is interposed between the input terminal 62 and the control electrode 126 of the device 122. The emitter 128 of the transistor 122 is connected to the common bus 108 and the transistor 122 collector is connected to one end of the shunting resistor 124. The opposite end of the shunting resistor 124 connects to the junction 94 between resistors 90 and 92 in the feedback bridge of the stabilizing circuit 76.

Another functional block of the amplifier stage 34 of FIG. 3 is a command signal input circuit 130 including resistors 132 and 134 in a bridge circuit. The aforementioned command reference signal, introduced at the terminal 40 of the amplifier stage 34, is connected to a junction 136 between the resistors 132 and 134 at the center of the bridge circuit. Connections from the resistors 132 and 134 to the signal input circuits 82 and 84 of the first and second amplifiers 72 and 74, respectively, complete the command signal input circuit 130.

In accordance with another aspect of this invention are two functional blocks, both related to processing the aforementioned electrical feedback derived from the speed sensor 28 of FIG. 1. This feedback is delivered to the amplifier stage 34 through the feedback input terminals 36 and 38 for processing in a feedback signal input bridge circuit 138 and a feedback adapter 140.

The feedback signal input bridge circuit 138 includes six resistors 142, 144, 146, 148, 150, and 152, and a second potentiometer-connected resistance unit 154 with an adjustable slider 156. The adjustable slider 156 provides a ready means of establishing the relationship of the feedback signal input bridge circuit to the common 108 through its connection thereto. The common bus 108 serves as a zero reference throughout the entire motor control system of FIG. 1. The resistors 142, 144, 146 and 148 together with the second potentiometer-connected resistance unit 154, in a series circuit relationship, form a bridge-type circuit which interconnects the signal input circuits 82 and 84 of the first and second amplifiers 72 and 74, respectively. Resistors 150 and 152 introduce the feedback signal into the bridge-type circuit at junctions 155 and 157, respectively. The feedback signal is introduced into resistors 150 and 152 by means of their respective connections 158 and 160 to the feedback adapter 140.

The feedback adapter includes energy-storing, filter capacitance 162 and a full wave single phase rectifier bridge 164. A midpoint 166 of the capacitance 162 is connected to the common bus 108. Extremities of the capacitance 162 and the polarized output of the full wave rectifier bridge 164. are electrically connected to the connections 158 and 160 for introduction into the feedback signal input bridge circuit 138. The full wave rectifier bridge 164 includes four rectifier junctions, 167, 168, 170 and 172. The rectifier bridge 164 has a positive output 174 and a negative output 176 coupled respectively through the connections 158 and 160 to the input bridge circuit 138. Input connections to the rectifier bridge 164 are 178 and 180 connected to feedback input terminals 36 and 38, respectively, of FIGS. 1 and 3. It is to these input terminals 36 and 38 that the electrical feedback proportional to motor speed, derived from the speed sensor 28 FIG. 1, is introduced.

The command reference signal, introduced at the terminal 40, determines the motor 10 direction of rotation and the motor 10 speed by its polarity and magnitude, respectively. The feedback from the speed sensor 28 may be either a-c voltage or randomly polarized d-c voltage. The ensuing description of the operational details of the amplifier stage 34 further clarifies its versatility and applicability to closed-loop regulating systems.

The earlier discussion of the operation of the motor control system of FIG. 1 touched briefly on the function of the amplifier stage 34 indicated therein as one of the system blocks. The other blocks comprising the system are well known in the motor control system art and are, therefore, not detailed. The amplifier stage 34 of FIG. 1 is detailed in FIG. 3 in a preferred embodiment to clarify this invention and permit its complete analysis. Consistent with the earlier description, the following discussion of operation presupposes a motor control system in which the motor 10, FIG. 1, is speed-regulated.

Considering in detail the operation of the amplifier stage 34, it will be noted with reference to FIG. 1 that its basic interconnections involve a quantity of eight identified terminals. These terminals, identically identified in FIG. 3, comprise the various input points, the primary output terminal and the common bus connection.

The command reference signal terminal 40 serves to introduce into the amplifier stage 34 through the command signal input circuit 130 a d-c signal proportional to the desired speed of the motor 10 of FIG. 1. The d-c signal may be of either positive or negative polarity and, as previously mentioned, may alternate between polarities if the motor control system application required reversible motor 10 operation. Coincidentally with motor 10 response to the command reference signal, the speed sensor 28 supplies a feedback through the feedback input terminals 36 and 38. The feedback is proportional to the motor 10 attained speed and is introduced into the feedback adapter 140, FIG. 3, of the amplifier stage 34. By virtue of the full wave rectifier bridge 164 input connections 158 and 160 to the normal a-c inputs, the feedback adapter 140 accepts either an a-c feedback, or a d-c feedback. The d-c feedback may be applied with either feedback input terminal 36 or 38 positive with respect to the other. Rectification in the full wave rectifier bridge 164 produces a d-c feedback signal which is definitely and unalterably polarized. The feedback signal in invariably positive at the rectifier bridge 164 output terminal 174 and negative at the output terminal 176. These polarities prevail with respect to each other and with respect to the system's common bus 108. The dual filter capacitance 162 permits attenuation of ripple or noise present in the feedback signal. A path for the ripple to the common bus 108 is provided by the midpoint 166 connection of the dual capacitance 162 to the common bus 108. The filtered, definitely polarized d-c feedback signal is delivered to the feedback signal input bridge circuit 138 through the connections 158 and 160.

The feedback signal input bridge circuit 138, like the other bridge circuits to be discussed later, includes a balanced resistance bridge. The resistors 150 and 152 are of the same nominal ohmic value. Similarly, it is intended that the resistors 142 and 144 equal the resistance value of the resistors 146 and 148, respectively. To insure the capability of balancing the feedback signal input bridge circuit 138, the second potentiometer-connected resistance unit 154 is employed at the theoretical center of the bridge circuit 138. By means of the adjustable slider 156 on the potentiometer-connected resistance unit 154 a precise balance is obtainable with reference to the common bus 108 to which the adjustable slider 156 is connected as shown. It will be appreciated that a lack of balance in this feedback signal input bridge circuit 138 is reflected in an inequality of the feedback signal influence on the signal input circuits 82 and 84 of the first and second amplifiers 72 and 74, respectively. Functionally, in the event of an imbalance, the motor 10, FIG. 1 would be driven faster in one direction than in the other by command reference signals of equal magnitude but of opposite polarities.

The positive and negative d-c output of the feedback signal input bridge circuit 138, FIG. 3 connect directly to the signal input circuits 82 and 84, respectively, of the first and second amplifiers 72 and 74, respectively, In the signal input circuits 82 and 84, these positive and negative feedback signals are compared to the output of the command signal input circuit 130.

The command signal input circuit 130 also includes a balanced bridge in which the resistors 132 and 134 are nominally of equal value. The command reference signal, introduced at input terminal 40, is connected to the junction 136 at the center of the balanced bridge between the resistors 132 and 134. The outputs of the command signal input circuit 130 from the extremities of the resistors 132 and 134 are connected to the signal input circuits 82 and 84, respectively, of the first and second amplifiers 72 and 74, respectively. A resultant combination with the polarized feedback signal on the signal input circuits 82 and 84 provides the aforementioned signal comparison and results in an operating error signal.

By its magnitude, the operating error signal indicates the extent of any existing discrepancy between the motor 10, FIG. 1 attained speed and the desired motor 10 speed. The desired motor 10 speed is that which corresponds to the value of the command reference signal introduced into the command signal input circuit 130, FIG. 3 at the terminal 40.

Further discussion of the operation of the reversible amplifier stage 34 is facilitated by the assumption of a definite polarity for the polarity-reversible command reference signal introduced at the terminal 40 of the amplifier stage 34. A command reference signal of either positive or negative d-c polarity operates the amplifier stage 34 in an identical manner, but activates alternate components. As previously mentioned, the processed feedback signal impresses a positive d-c value on the signal input circuit 82 of the first amplifier 72, and a negative value on the signal input circuit 84 of the second amplifier 74. For purposes of discussion and clarification, a positive d-c command reference signal of finite magnitude is assumed. Also assumed is acceleration of the motor 10 FIG. 1 toward its speed level corresponding to the assumed command reference signal. The command signal input circuit 130, FIG. 3 into which the command reference signal is introduced through the terminal 40 impresses this positive d-c command reference signal equally on the signal input circuits 82 and 84 of the first and second amplifiers 72 and 74, respectively. This activates both of the amplifiers 72 and 74 in which, as is customary, a polarity inversion occurs. A negatively polarized d-c output of the first and second amplifiers 72 and 74, respectively, is thus created in their respective output circuits 78 and 80. These outputs are combined in the first output bridge circuit 70 and a signal proportional to the sum of these outputs appears at the output terminal 54 of the amplifier stage 34. As the motor 10, FIG. 1 responds to the effect of this output on the power control unit 16, the speed sensor 28 output level increases. This creates an increasingly positive feedback signal at the signal input circuit 82 FIG. 3 of the first amplifier 72, additive to the assumed positive command reference signal. COnversely, at the signal input circuit 84 of the second amplifier 74, an increasingly negative feedback signal is experienced. Thus, as referred to the common bus 108, the error signal at the first preamplifier 72 signal input circuit 82 becomes increasingly positive as the motor 10 FIG. 1 accelerates. The error signal at the signal input circuit 84 of the second amplifier 74 becomes progressively and correspondingly less positive with reference to the common bus 108. The error signal at signal input circuit 84 becomes an operating error signal when a command reference signal of positive d-c polarity is employed.

Resistors 90 and 92 of the stabilizing circuit 76 serve as buffer resistors and prevent undue transfer between the operating error signal applied to the second amplifier 74 and a non-operating error signal extant at the signal input circuit 82 of the first amplifier 72.

The diode rectifier 114 is so polarized as to prevent the non-operating error signal, representative of the sum of the positive command reference signal and the positive portion of the feedback signal, from amplification in the first amplifier 72.

The diode rectifier 114 associated with the first amplifier 72 would conduct the positive non-operating error signal at the signal input circuit 82 to the output circuit 78 were not this non-operating signal inverted in the first amplifier 72. A negative voltage on the output circuit 78 in excess of the low forward blocking voltage of the diode rectifier 114 biases that diode rectifier into its conductive state. In this conductive state, the diode rectifier 114 becomes a local negative feedback and serves as a gain limit or clamp with respect to the first amplifier 72.

If the assumed polarity of the command reference signal were negative rather than positive, diode 116 would similarly limit or clamp the gain of the second amplifier 74. Under the presently assumed operating conditions with the positive command reference signal, the diode 116 is back biased and maintained in its non-conductive state. These conditions eliminate the gain limit function of the diode 116, and permit normal operating error signal amplification in the second preamplifier 74. The output circuit 80 of the second amplifier 74 delivers the negative d-c amplified operating error signal to the first output bridge circuit 70 output terminal 54 for interconnection to the power control unit 16 of FIG. 1.

As previously suggested, introduction of a negative d-c command reference signal at the terminal 40, FIG. 1 of the command signal input circuit 130 yields identical operation of the amplifier stage 34. In this instance, an operating error signal occurs on the signal input circuit 82 of the first amplifier 72. The second amplifier 74 is clamped or gain limited by its associated rectifier 116 which is biased into its conductive state by the non-operating error signal and the second amplifier 74 output.

In accordance with another aspect of this invention, the amplifier stage 34 includes an additional function in the form of the automatic response adjustment circuit 118. This unit is functionally described in previous portions of this specification. A detailed operational discussion of this aspect follows in the succeeding paragraphs.

The automatic response adjustment circuit 118 function is so closely allied with that of the stabilizing circuit 76 that commentary on the latter is necessarily included in the discussion of the former.

A conventional stabilizing circuit operates to diminish the response rate of an operating amplifier paralleled thereby. The stabilizing circuit 76, FIG. 3, effectively parallels both the first and second amplifiers, 72 and 74, respectively. Considering the first amplifier 72 for example, the parallel stabilizing circuit is provided by the series-connected components including the resistor 86, the first resistance unit 102, the slider 100, the capacitance 98, and the resistors 96 and 90. This series circuit connects the output circuit 78 of the first amplifier 72 to the signal input circuit 82 of the first amplifier 72, and becomes a local transient feedback circuit. Since the relative d-c polarities of the signal input circuit 82 and of the output circuit 78 are opposing, negative feedback as earlier defined, prevails. The adjustability of the slider 100 on the first resistance unit 102 enables the establishment of a level of local transient feedback. The level is increased as the slider 100 is moved toward the junction 104. This setting also increases the total impedance between the signal input circuit 82 and the common bus 108 at the junction 106, and the resistance between the capacitance 98 and the junction 106. Together, these increase reduce transient gain in the first amplifier 72 and the response of the first amplifier 72 is thereby minimized to yield maximum stability. If all portions of the motor control systems of FIG. 1 maintained uniform gain throughout their operating range, a single, optimum setting of the slider 100, FIG. 3 would be possible. As pointed out with reference to FIG. 2, the motor 10 of FIG. 1 experiences an increasing loss of torque capability as it accelerates through its constant horsepower speed range.

It is apparent from the foregoing discussion of the stabilizing circuit 76 of FIG. 3, and consideration of the motor torque change that optimum performance of the motor 10 FIG. 1 is not attainable over its entire speed range at a single setting of the slider 100 FIG. 3. A setting of the slider 100 which provides optimum motor performance in the constant torque, armature voltage speed range yields slower motor response in its constant horsepower, field weakening speed range. If the slider 100 is adjusted to yield optimum performance in the higher speed range, system instability is likely in the lower speed range. The automatic transient gain adjustment circuit 118 is directed to a solution of this problem.

For the moment, consider the transistor 122 collector to emitter — 130 to 128 — junction as non-conductive. In this state, the transistor 122 and the automatic transient gain adjustment circuit 118 have no effect on the response or transient gain of the amplifier stage 34. The stabilizing circuit 76 is then adjusted to provide optimum performance of the motor 10, FIG. 1 during its acceleration through its constant torque speed range.

If acceleration of the motor 10 is continued into its constant horsepower, shunt field 20 weakening speed range wherein reduced torque capability prevails, the adjustable voltage exciter 26 output diminishes. When the diminution reaches an adjustable, predetermined level corresponding to a given reduction in the torque capability of the motor 10, the adjustable voltage exciter 26 provides a control output at its terminal 60. This control output is impressed on the amplifier stage 34 at terminal 62. Referring to FIG. 3, it will be noted that the terminal 62 is connected through the resistor 120 to the base electrode 126 of the transistor 122. By means of this connection, the control output of the adjustable voltage exciter 26, FIG. 1 governs the automatic response adjustment circuit 118. Since the emitter 128 of the NPN type transistor 122 connects directly to the common bus 108, a voltage which is positive with respect to the common bus 108 applied at the base electrode 126 causes the transistor to assume its conductive state. A diode rectifier 129 is interposed between the common bus 108 and the transistor 122 base electrode 126 connection. The diode rectifier 129 serves to protect the transistor 122, should a negative voltage be applied the base electrode 126.

Unlike the previously considered situation with the transistor 122 in its passive state with no influence on the response of the amplifier stage 34, conductivity of the transistor 122 produces a response increase in the amplifier stage 34. During conductivity of the transistor 122, the resistor 124 is effectively connected at one end to the common bus 108. The second end of the resistor 124 is connected through the junction 94 and the resistor 96 to the capacitance 98. The circuit thus established from the capacitance 98 to the common bus 108 shunts current flowing through the capacitance 98 to the common bus 108, thereby decreasing the transient negative feedback to input circuits 82 and 84. This increases the amplifier stage 34 response rate or transient gain. Since the value of response is readily adjustable by varying the ohmic value of the resistor 124, changes in motor torque capability over a wide latitude may be compensated for by this invention.

Inspection of FIG. 3 in detail with respect to the deployment and operation of the transistor 122 reveals that its collector-emitter junction, 130–128, must be made conductive regardless of the relative polarization across that junction. This is a requirement since the transistor 122 must be able to operate on either the first or second amplifier, 72 or 74, respectively. This contradiction of the normal concept of transistor operation is made possible by an abnormally large current in the base 126 circuit. Many transistors display such a loss of polarity discrimination in their collector-emitter junctions if circuit parameters are such that their base current exceeds their emitter current.

This invention is not limited to the specific details of the preferred embodiment illustrated. It is contemplated that many changes to and modifications of this embodiment will occur to those skilled in the art. As examples, with respect to the transient gain adjust feature, a plurality of gain change steps may be used or the automatic transient gain adjustment circuit 118 may be employed with an amplifier stage including a single amplifier. With respect to the feedback adapter 140, if the feedback thereto is always of identically polarized d-c, the feedback adapter 140 is superfluous. It is, therefore, intended that the appended claims cover all such changes, additions and modifications as fall within the true spirit and scope of this invention.

What we claim as new and desire to secure by Letters Patent of the United States is:

1. In a drive system including a d-c motor and power conversion means for supplying electric power to the armature and field of the d-c motor in response to a regulated control signal, improved control means for generating the regulated control signal comprising:

a. means for producing a d-c command signal having a magnitude and polarity representative of desired motor performance,
b. means for producing an electric feedback signal having a magnitude representative of attained motor performance,
c. first amplifying means including input means and output means,
d. second amplifying means including input means and output means,
e. first network means including rectifying means coupled to said feedback signal producing means and said input means of each of said first and second amplifying means and being responsive to the feedback signal to supply a positive polarity signal to said first amplifying means and a negative polarity signal to said second amplifying means, said positive and negative polarity signals having magnitudes representative of attained motor performance,
f. second network means coupled to command signal producing means and said input means of said first and second amplifying means and responsive to the command signal to supply to each of said input means a d-c signal having a magnitude and polarity representative of desired motor performance,
g. said first amplifying means being operative when the signals supplied thereto by said first and second network means have a net negative polarity and said second amplifying means being operative when the signals supplied thereto by said first and second network means have a net positive polarity,
h. and third network means coupled to said output means of each of said first and second amplifying means for receiving output signals therefrom and producing in response thereto a regulated control signal for delivery to the power conversion means.

2. Control means according to claim 1 in which said means for providing an electric feedback signal having a magnitude representative of attained motor performance comprises means coupled to the motor to operate at a speed proportional to that of the motor armature.

3. Control means according to claim 1 further comprising stabilizing means interconnecting said first and second amplifying means to stabilize the operative ones of said amplifying means during generation of a regulated control signal.

4. Control means according to claim 1 in which each of said first and second amplifying means includes rectification means disposed such that said first amplifying means is inoperative when the net signal supplied thereto is positive and such that said second amplifying means is inoperative when the signal supplied thereto is negative.

5. In control means for a drive system including a d-c motor and power conversion means for supplying electric power to the armature and field of the d-c motor in response to a regulated control signal generated by the control means, improved amplification means comprising:

first amplifying means,
second amplifying means,
first input circuit means connected to a command source to introduce therefrom a signal having a magnitude and polarity representative of a desired motor performance and direction of rotation,
second input circuit means coupled to the motor to introduce therefrom an electrical feedback signal indicative of the attained motor performance in the desired direction of rotation,
rectifier means connected to said second input circuit means to provide a pair of feedback signals of opposite polarity proportional to, and regardless of the polarity, wave shape and frequency of the electrical feedback signal, the attained motor performance,
circuit means connected to said first input circuit means, said rectifier means, and said first and second amplifying means to supply the signal representative of the desired motor performance to both of said amplifying means and a selected one only of said feedback signals to each of said amplifying means,
means connected to said first and second amplifying means to activate the one of said amplifying means to which signals of opposite polarity are supplied,
common stabilizing means coupled to both of said first and second amplifying means to stabilize the operative one of said amplifying means during generation of a regulated control signal,
and automatic response rate adjustment means coupled to the motor and said common stabilizing means to adjust the response rate of the operative one of said amplifying means in response to changes in the response rate of the motor.

6. In a closed-loop motor control system including a drive motor with means responsive to the performance of the motor to create a feedback proportional to a parameter of the drive motor's performance; a power control unit connectable to a source of electrical energy and to the drive motor to supply power to the motor in accordance with an input signal to the power control unit; a three wire, regulated d-c control power supply connected to the power control unit; a source of command signals to govern the drive motor's performance, also connected to the three wire, regulated d-c power supply; and the improvement which includes an amplifier stage comprising in combination:

a. two amplifiers, each of which is connected to the aforesaid three-wire regulated d-c control power supply;
b. a signal input circuit and an output circuit connected electrically to each of said amplifiers;
c. diode rectifiers in parallel circuit relationship with each of said amplifiers, the first of said diode rectifiers polarized to pass a positive signal from said signal input circuit of the first of said amplifiers to said output circuit of said first amplifier, and the second of said diode rectifiers polarized to pass a negative signal from said signal input circuit of the second of said amplifiers to said output circuit of said second amplifier;
d. first and second output bridge circuits connecting said output circuit of said first amplifier to said output circuit of said second amplifier, each of said bridge circuits comprising an essentially center-tapped resistance including connection means at the center tap, the first of said output bridge circuits provides an output connection for said amplifier stage, said output connection being connectable to supply the aforesaid power control unit with its aforesaid input signal;
e. a stabilizing circuit for said amplifier stage, said stabilizing circuit comprising the second of said output bridge circuits, which includes a potentiometer-connected resistance unit electrically and serially connected between said output connection of said second output bridge circuit and a common connection point of the aforesaid three-wire, regulated d-c control power supply, said potentiometer-connected resistance unit having a third connection point adjustable between its aforesaid connections to the output connection of said second output bridge circuit and to said common connection point, a resistor and a capacitor in a series circuit configuration, said capacitor electrically connected to said third connection point of said potentiometer-connected resistance unit, said resistor terminating in a junction point at the end remote from said capacitor, and a first input bridge circuit including an essentially center-tapped resistance unit, said resistance unit electrically connected between said signal input circuits of said first and second amplifiers and including connection means at the center tap, said connection means providing the junction point for said resistor of said resistor and capacitor series circuit;
f. a command signal input bridge circuit, comprising an essentially center-tapped resistance bridge unit, connected between said signal input circuits of said first and second amplifiers, and including connection means at its center tap into which the aforesaid command signal source delivers a command signal representative of the desired performance of the aforesaid drive motor means with respect to a regulated parameter of drive motor performance;

g. a feedback signal input bridge circuit comprising six resistors and a potentiometer-connected resistance unit, four of said resistors and the resistance unit of said potentiometer-connected resistance unit serially connected, said resistance unit in the center, location wise and resistance wise, said four serially connected resistors and said resistance unit forming a bridge circuit connected between said signal input circuits of said first and second amplifiers, the first of the remaining two of said six resistors, each having a termination at one end connected electrically at its end opposite the termination to a junction between the two of said six resistors connected to a first end of said resistance unit, the other and final of the remaining two of said six resistors connected electrically, at the end opposite its termination, to a junction between the two of said six resistors connected to a second end of said resistance unit, a third and adjustable connection of said potentiometer-connected resistance unit electrically connected to the common connection point of the aforesaid, three-wire regulated d-c power supply; and, h. a feedback adapter comprising single-phase full wave rectifier means, having two a-c and two d-c junctions with filter means connected between its d-c junctions, said full wave rectifier means incorporating connection means to accommodate the aforesaid feedback at its a-c junctions, said filter means including center-tapped capacitive means with terminals at each end and at the center thereof, connection means to connect the center terminal to the common connection point of the aforesaid three-wire regulated d-c power supply and the end terminals of the capacitive means to the aforesaid terminations of the aforesaid remaining two of said six resistors in said feedback signal input bridge circuit.

7. A closed-loop, motor control system according to claim 6, including an automatic response rate adjustment means to compensate for reduced motor torque capability, comprising in combination: a semi-conductor device with four operative connections, having a resistive signal input connection to a control electrode, a reference connection between a first electrode of said semi-conductor device and the aforesaid common system bus, a protective connection incorporating a rectifier between the first electrode of said semi-conductor device and said signal input connection, and an output connection from a second electrode of said semi-conductor device through a resistance to the aforesaid junction point of the aforesaid first input bridge circuit, said automatic response rate adjustment means being responsive to a signal impressed on said signal input connection to establish an electrical path through a junction of said semi-conductor device between said first electrode and said second electrode to provide an electrically conductive path from the aforesaid junction point of the aforesaid first input bridge circuit to the aforesaid common system bus.

8. A closed-loop motor control system according to Claim 7 wherein said semi-conductor device is a transistor.

* * * * *